United States Patent
Satake et al.

(10) Patent No.: US 8,260,497 B2
(45) Date of Patent: Sep. 4, 2012

(54) VEHICLE CONTROL DEVICE

(75) Inventors: Toshihide Satake, Chiyoda-ku (JP);
Hiroshi Fujioka, Chiyoda-ku (JP);
Kohei Mori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 545 days.

(21) Appl. No.: 12/498,823

(22) Filed: Jul. 7, 2009

(65) Prior Publication Data

US 2010/0010711 A1    Jan. 14, 2010

(30) Foreign Application Priority Data

Jul. 9, 2008 (JP) ................. 2008-179091

(51) Int. Cl.
*F16H 61/00* (2006.01)
*B62D 5/04* (2006.01)
*G06F 19/00* (2006.01)

(52) U.S. Cl. ............... 701/41; 701/42; 701/71; 180/448

(58) Field of Classification Search .................... 701/41, 701/42, 71; 180/446, 442
See application file for complete search history.

(56) References Cited

U.S. PATENT DOCUMENTS 6,041,887 A * 3/2000 Kojo et al. ................. 180/446
6,523,638 B1 * 2/2003 Yamauchi et al. ........... 180/446

FOREIGN PATENT DOCUMENTS

| JP | 60-169330 A | 9/1985 |
| JP | 07-305762 A | 11/1995 |
| JP | 07-329609 A | 12/1995 |
| JP | 08-210456 A | 8/1996 |
| JP | 2007-139052 A | 6/2007 |
| JP | 2008-087529 A | 4/2008 |

* cited by examiner

*Primary Examiner* — Tan Q Nguyen
(74) *Attorney, Agent, or Firm* — Sughrue Mion, PLLC

(57) ABSTRACT

In the conventional vehicle control device, since a detection timing of turn is late, at the time of making the change of gear ratio based the detection timing, a sense of discomfort is brought to a driver. Moreover, steering wheel angle sensor, yaw rate sensor or lateral acceleration sensor is very expensive, resulting in the cost increase of the vehicle control devices. From information regarding a steering force that can be obtained from an electric power steering device, a turn intention of a driver is detected, and based the turning intention, the change of gear ratio is conducted.

11 Claims, 7 Drawing Sheets

VEHICLE CONTROL DEVICE

BACKGROUND OF THE INVENTION

1. Field of the Invention

The present invention relates to a vehicle control device making a control of an automatic transmission and, more particularly, to a gear ratio control at the time of turning.

2. Description of the Related Arts

A vehicle control device of such type has been conventionally known, and in which turning of a vehicle is detected and a gear ratio is made larger during turn (it is changed to the shift-down side), whereby a vehicle is brought in speed reduction due to generation of an engine brake and the turn is made safely, as well as an accelerating performance at the end of the turn is improved (refer to the Japanese Patent Publication (unexamined) No. 169330/1985 and the Japanese Patent No. 3588818).

In the above conventional vehicle control device, to detect the turn of a vehicle, a steering wheel angle sensor, a yaw rate sensor or a lateral acceleration sensor has been used. In the steering wheel angle sensor, however, a driver generates a steering torque, this torque exceeds the friction of a steering mechanism, and then at the time point when the steering wheel begins to rotate, it is eventually detected to be turning. In the yaw rate sensor and the lateral acceleration sensor, a wheel is steered in accordance with the rotation of the steering wheel, a lateral force is generated at a tire, and then at the time point when the movement of a vehicle in the yaw direction and in the lateral direction is generated, it is eventually detected to be turning. Accordingly, in the conventional vehicle control device, the turning is eventually detected after going through several stages since a driver intends to turn and generates a steering torque.

On the other hand, in the case of making a gear ratio change for turning, it is ideal to complete the gear ratio change before a vehicle begins to turn because there is no change in driving force during turning and thus an uncomfortable feeling is not brought to a driver. Therefore, in such device, it is important to detect the turn intention of a driver and to start the change of gear ratio as early as possible. As described above, however, since detection timing of the turn is late in the conventional device, a problem exists in that a driver is sometime provided with a sense of discomfort at the time of conducting the change of gear ratio. Moreover, the steering wheel angle sensor, yaw rate sensor and lateral acceleration sensor are very expensive, and another problem exists in bringing cost increase of the vehicle control device.

SUMMARY OF THE INVENTION

The present invention was made to solve the above-discussed problems, and has an object of providing a vehicle control device of higher performance and more inexpensive than ever before in which at the time when a driver intends to turn and generates a steering torque, the change of gear ratio is started at once, thereby performing a good turning without bringing an uncomfortable feeling to the driver; and in which any expensive sensor such as steering wheel angle sensor, yaw rate sensor or lateral acceleration sensor is not used.

A vehicle control device according to the present invention includes: turn intention detecting means for detecting a turn intention of a driver at least based on information regarding a steering force of a steering; and gear ratio control means for controlling a gear ratio of an automatic transmission; and in which the mentioned gear ratio control means controls the gear ratio based on an output from the mentioned turn intention detecting means.

Since the vehicle control device according to the invention is includes: turn intention detecting means for detecting a turn intention of a driver at least based on information regarding a steering force of a steering; and gear ratio control means for controlling a gear ratio of an automatic transmission; and in which the mentioned gear ratio control means controls the gear ratio based on an output from the mentioned turn intention detecting means; at the time when a driver intends to turn and generates a steering torque, the change of gear ratio is started at once, thereby performing a good turning without bringing an uncomfortable feeling to the driver; and expensive sensors such as a steering wheel angle sensor, a yaw rate sensor or a lateral acceleration sensor are not used, so that it is possible to provide a vehicle control device of higher performance and more inexpensive than ever before.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Embodiment 1

A preferred embodiment of a vehicle control device according to the present invention is hereinafter, described referring to the accompanying drawings.

Figure 1:
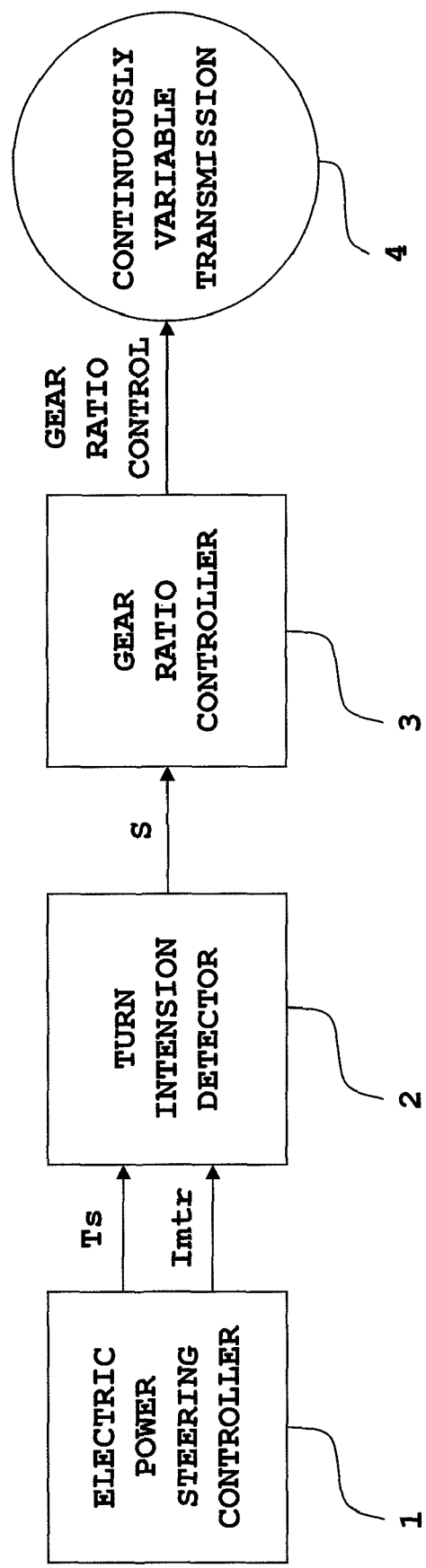
FIG. 1 is a schematic diagram of a vehicle control device according to a first embodiment of the present invention.

FIG. 1 is a schematic diagram of a vehicle control device according to a first embodiment. Reference numeral 1 designates an electric power steering controller, which controls en electric motor for steering assist and outputs a steering torque signal Ts and a motor current signal Imtr. Numeral 2 designates a turn intention detector, which calculates a turn intention indicator S based on the steering torque signal Ts and the motor current signal Imtr to output it to a gear ratio controller. Numeral 3 designates a gear ratio controller, which controls a gear ratio of a transmission 4 based on a turn intention indicator S. Incidentally, the transmission 4 used in this embodiment is to be a continuously variable transmission (CVT).

Figure 2:
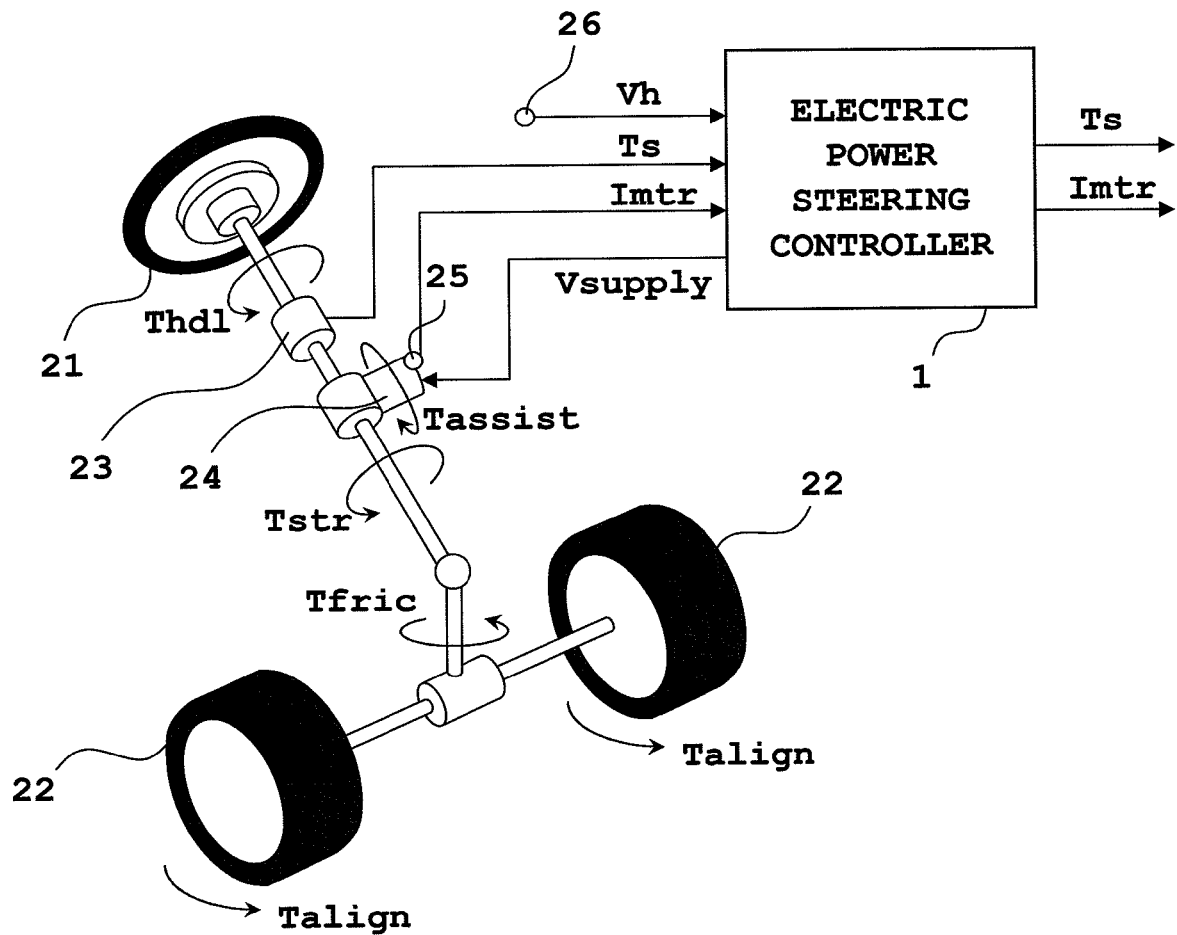
FIG. 2 is an explanatory view of a steering mechanism of a vehicle including an electric power steering controller according to the first embodiment of the invention.

Now, operations of the vehicle control device according to this embodiment are hereinafter described. First, the electric power steering controller 1 is described. FIG. 2 is a view for explaining a steering mechanism of a vehicle including the electric power steering controller 1. In FIG. 2, numeral 21 designates a steering wheel; numeral 22 designates a tire; numeral 23 designates a torque sensor detecting a steering torque Thdl of a driver and outputting a steering torque signal Ts; numeral 24 designates an electric motor generating a steering assist torque Tassist; numeral 25 designates a current sensor detecting an electric current of the electric motor 24 and outputting a motor current signal Imtr; numeral 26 designates a vehicle speed sensor detecting a velocity of a vehicle and outputting a vehicle speed signal Vh; and numeral 1 designates an electric power steering controller. Incidentally, Tstr is a steering shaft torque, which is coincident with a total value of the steering torque Thdl and the steering assist torque Tassist, and additionally which corresponds to a total value of a surface reaction force Talign and a steering mechanism friction Tfric. Vsupply is a voltage that the electric power steering controller 1 supplies to the electric motor 24.

Figure 3:
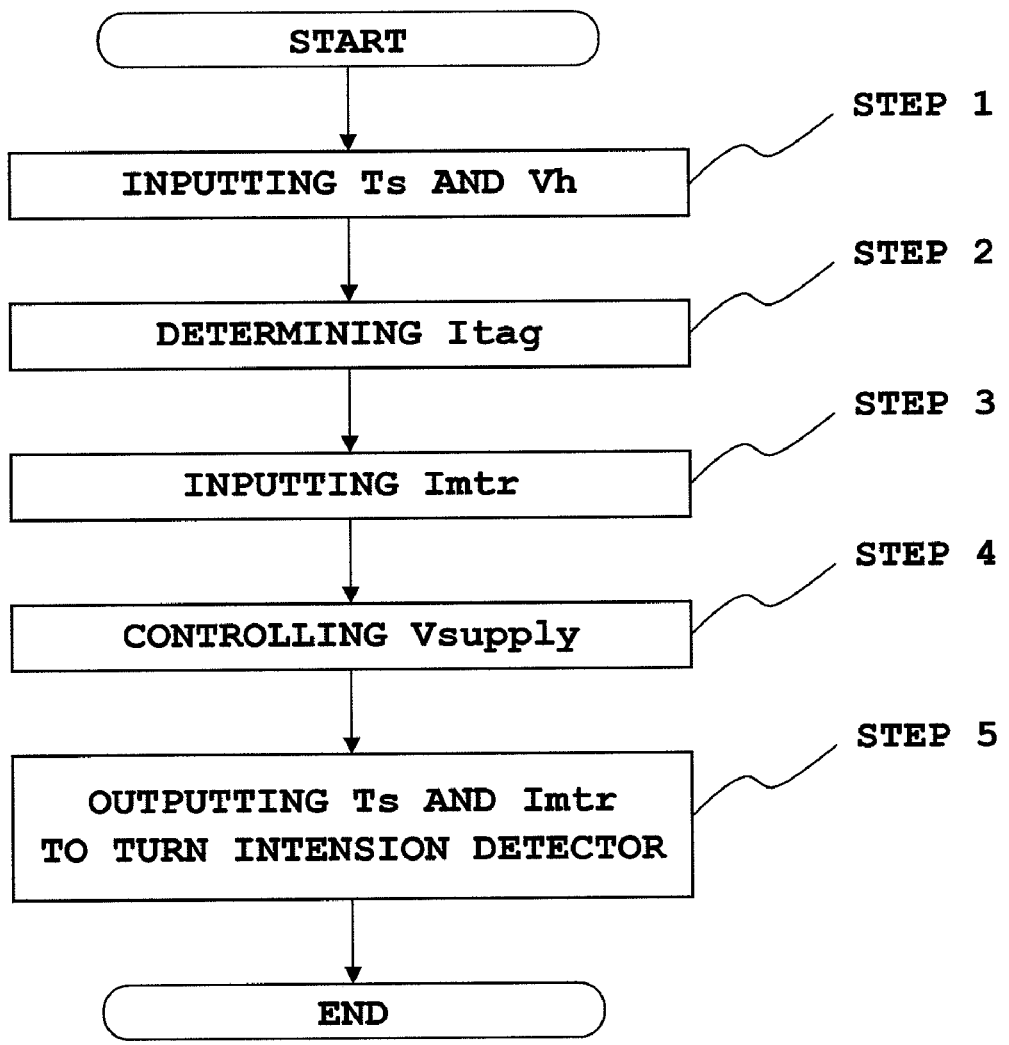
FIG. 3 is an operation flowchart of the electric power steering controller according to the first embodiment of the invention.
Figure 4:
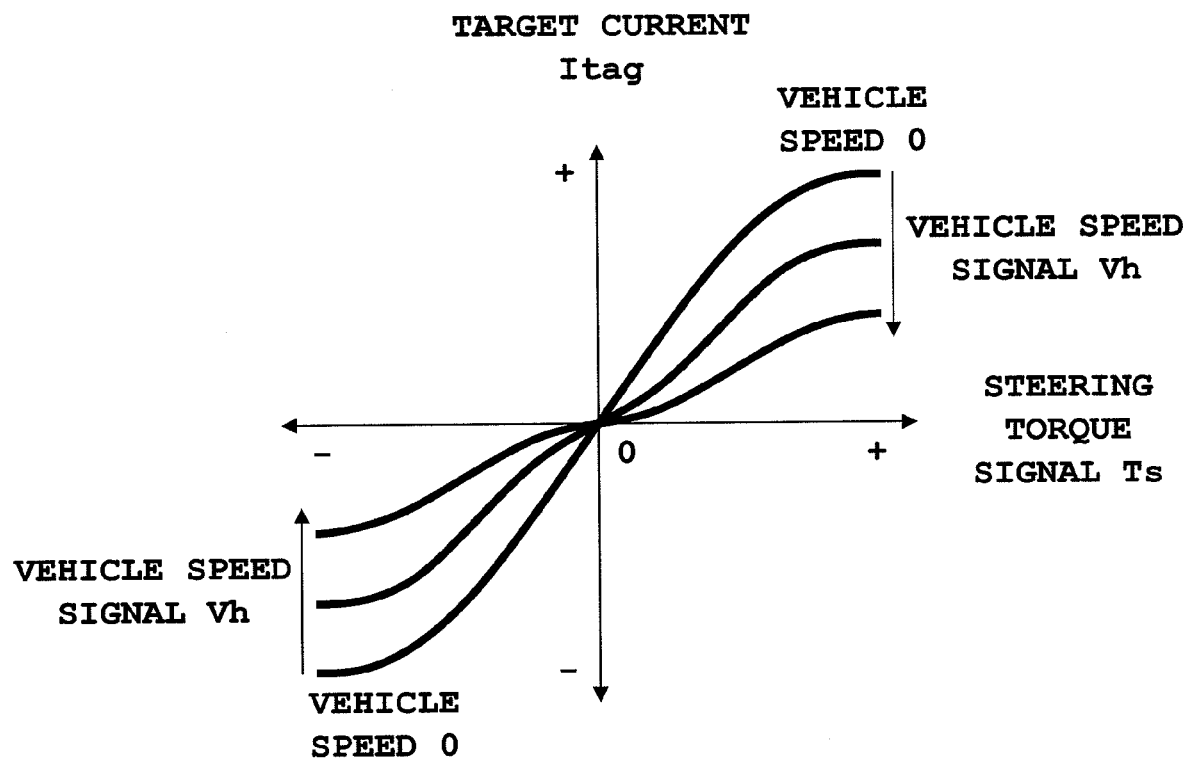
FIG. 4 is a map for determining a target current in the electric power steering controller according to the first embodiment of the invention.

Now, operations of the electric power steering controller 1 are described. FIG. 3 is a flowchart of showing an operation flow of the electric power steering controller 1, and in which processing in Steps 1 to 4 is that of a generally known electric power steering. First, a steering torque signal Ts and a vehicle speed signal Vh are inputted (Step 1). Next, based on the steering torque signal Ts and the vehicle speed signal Vh, a target current Itag of the electric motor 24 is determined (Step 2). In this embodiment, the target current Itag is determined generally according to a map as is illustrated in FIG. 4. Subsequently, a motor current signal Imtr is inputted (Step 3), and a motor supply voltage Vsupply is controlled so that the motor current signal Imtr is coincident with the target current Itag (Step 4). In this manner, the electric power steering controller 1 controls a steering assist torque Tassist.

Further, in the electric motor power steering controller 1 according to this embodiment, for making gear ratio control at the time of turning, being an object of this device, the steering torque signal Ts and the motor current signal Imtr are outputted to the turn intention detector 2 (Step 5). As described above, the total of a steering torque Thdl and a steering assist torque Tassist is a steering shaft torque Tstr, and the later-described turn intention detecting means 2 is inputted with the torques to be able to operate a steering shaft torque Tstr. The steering assist torque Tassist can be operated by multiplying the motor current signal Imtr by the known constant. The electric power steering controller 1 repeats the processing of Steps 1 to 5 at predetermined intervals.

Now, the turn intention detector 2 is described. The turn intention detector 2 according to this embodiment, as described above, is inputted with the steering torque signal Ts and the motor current signal Imtr, operates the steering shaft torque Tstr on the basis of an expression 1, and outputs it to the gear ratio controller 3 as a turn intention indicator S.

Turn intention indicator S=Steering shaft torque Tstr=Steering torque signal Ts+Motor current signal*Imtr*Kt*  Expression 1.

where: Kt is a conversion constant of a motor current to a steering assist torque.

Figure 5:
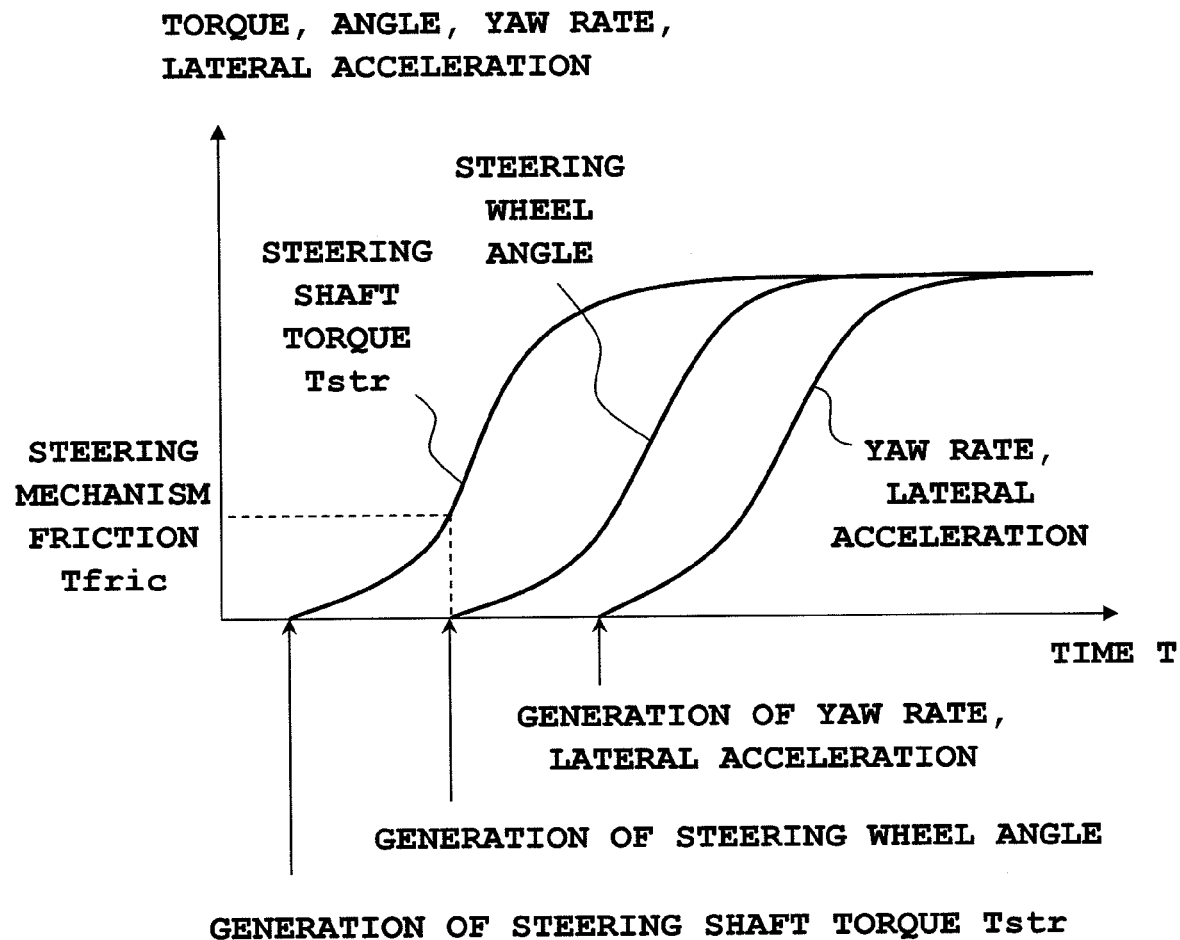
FIG. 5 is an explanatory chart indicating a phase relationship between a steering shaft torque, a steering wheel angle, a yaw rate and a lateral acceleration according to the first embodiment.

In this connection, characteristics of the steering shaft torque Tstr serving as a turn intention indicator is described referring to FIG. 5. FIG. 5 shows a map comparing phases of a steering shaft torque Tstr, a steering wheel angle, a yaw rate and a lateral acceleration at the time of beginning to turn from straight-ahead driving. When a driver intends to turn and generates a steering torque, in accordance with this steering torque, electric current flows through the electric motor of the electric power steering and a steering assist torque is generated. Further, at a time point when the total torque of the steering torque and the steering assist torque, that is, the steering shaft torque Tstr exceeds the steering mechanism friction Tfrc, a steering wheel angle begins to be generated. Further, wheels are steered in accordance with the rotation of the steering wheel, a lateral force is generated at the tire, the movement of vehicle in yaw direction and in lateral direction is generated, and eventually yaw rate or lateral acceleration is generated. According to such principle, with the use of the steering shaft torque Tsr, the turn intention of a driver can be detected earlier than using steering wheel angle, yaw rate sensor or lateral acceleration sensor.

Figure 6:
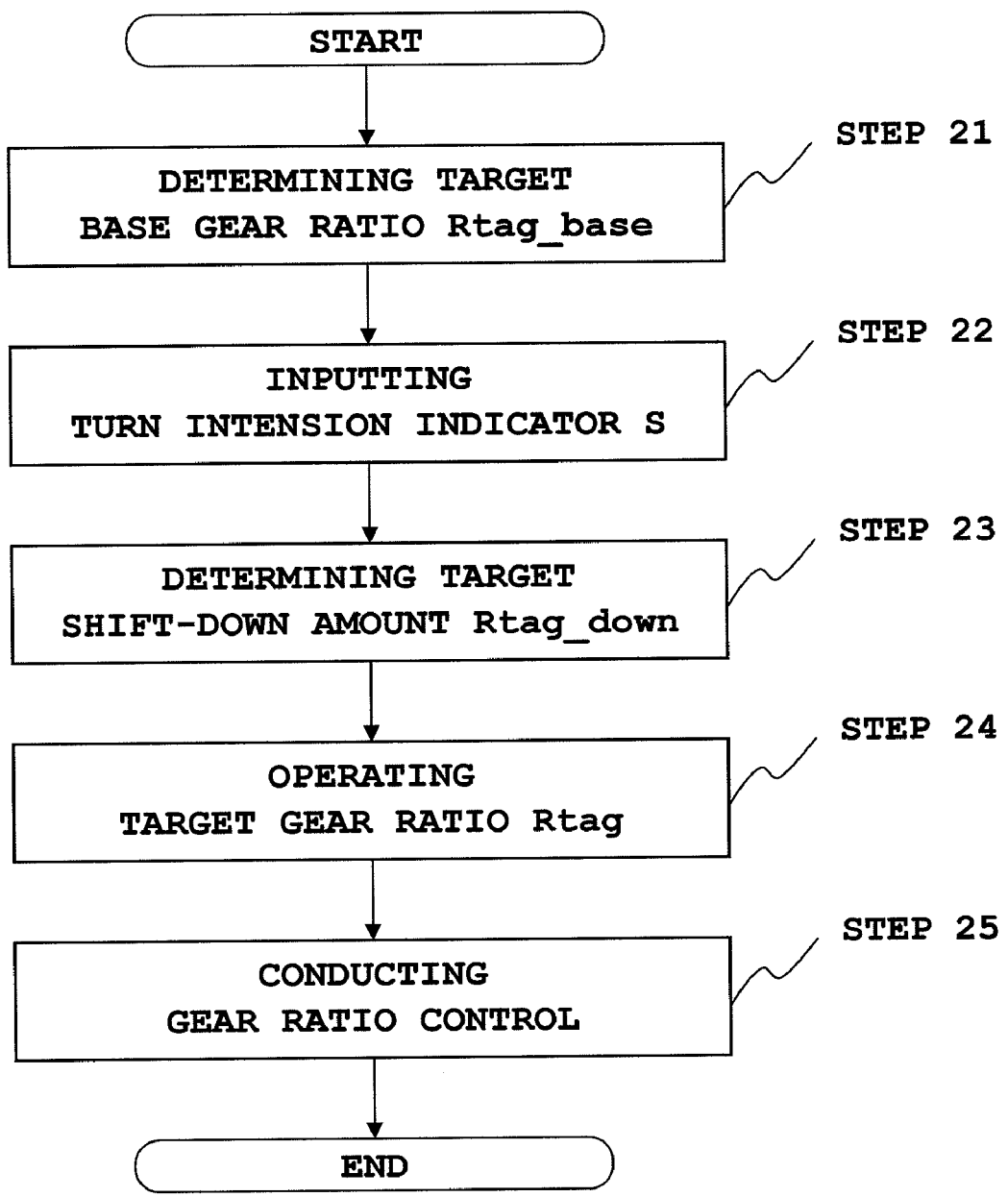
FIG. 6 is an operation flowchart of a gear ratio controller according to the first embodiment of the invention.
Figure 7:
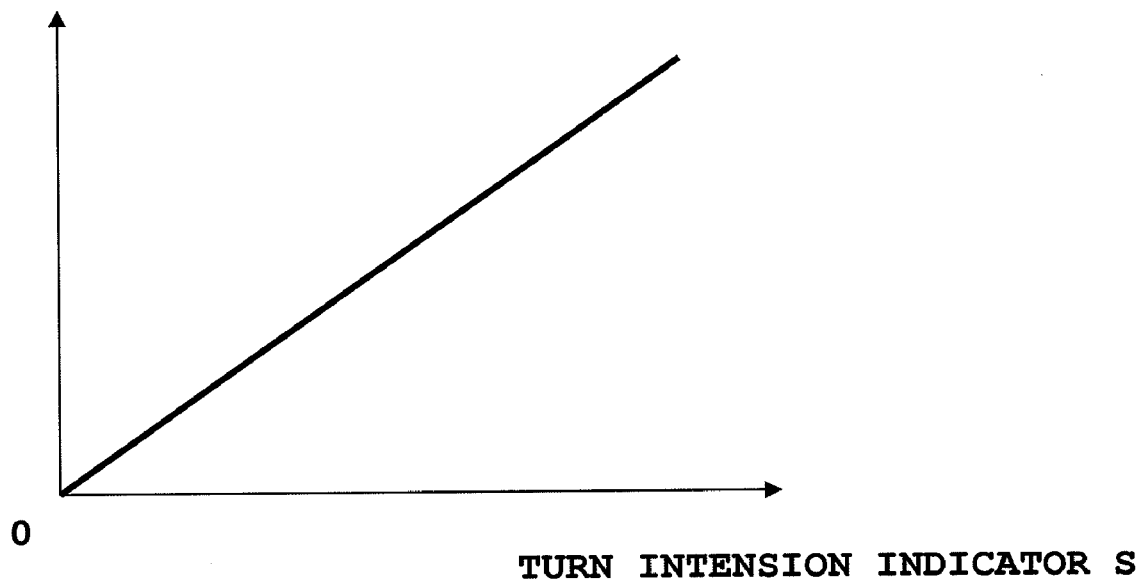
FIG. 7 is a map for determining a target shift-down amount in the gear ratio controller according to the first embodiment of the invention.

Now, the gear ratio controller 3 and the transmission 4 are described. FIG. 6 is a flowchart showing an operation flow of the gear ratio controller 3. First, a target base gear ratio Rtag_base is determined based on an accelerator pedal depression amount or a vehicle speed (Step 21). Although a general gear ratio controller makes a gear ratio control of the transmission 4, based on the target base gear ratio Rtag_base having been operated in this Step 21, the gear ratio controller 3 according to this embodiment executes the following processing for the gear ratio control at the time of turning, being an object of this device. First, a turn intention indicator S to be outputted from the turn intention detector 21 is inputted (Step 22), and based on the turn intention indicator S, a target shift-down amount Rtag_down is determined. In this process, as is illustrated in FIG. 7, as the turn intention indicator S is increased, the target shift-down amount is set so as to be larger (Step 23). Next, based on an expression 2, a target gear ratio Rtag is operated (Step 24).

Target gear ratio Rtag=Target base gear ratio Rtag_base+Target shift-down amount Rtag_down  Expression 2

Then, based on the target gear ratio Rtag having been operated, a gear ratio control of the transmission 4 is made (Step 25). The gear ratio controller 3 repeats the processing of these Steps 21 to 25 at predetermined intervals.

Thus, in the vehicle control device according to this embodiment, based on a steering torque signal Ts and a motor current signal Imtr to be outputted from the electric power steering controller, the turn intention of a driver is detected, and the gear ratio control at the time of turn is made. In this manner, not only the turn intention can be detected earlier than ever before and a vehicle control without a sense of discomfort can be made, but also instead of sensors such as conventional steering wheel angle or yaw rate sensor or lateral acceleration sensor, signals that can be obtained from the electric power steering controller are used, so that cost reduction of the vehicle control device can be achieved. Incidentally, an electric power steering device is more fuel efficient than the conventional hydraulic power steering device by about 5%, and comes to be a standard equipment in almost all types of vehicles in recent years in the tendency to placing greater emphasis on environmental or resources measures.

Incidentally, although in this embodiment, a target shift-down amount is set to be larger as a turn intention indicator is increased, as is illustrated in FIG. 7. This is because, as the turn intention is increased, a vehicle can be brought in speed reduction by a larger engine brake, and thus a better turn feeling is likely to be obtained. However, the method of determining a target shift-down amount from the turn intention indicator is not limited thereto, and it is preferable to make a setting in accordance with vehicle characteristics to be a target. For example, it is preferable that a target shift-down amount is changed in accordance with a vehicle speed, and the target shift-down amount in the case of high speed is set to be smaller than in the case of low speed. Further, it is preferable that the turn intention indicator itself is corrected with a vehicle speed, and as a result, the target shift-down amount in the case of high speed is set to be smaller than in the case of low speed.

In addition, in this embodiment, based on signals to be outputted from the electric power steering controller, the turn intention of a driver is detected and the shift-down is made at the time of turning. In the case that the turn intention indicator is larger than a predetermined value, even if the shift-down is not conducted but the change of gear ratio is limited to a predetermined range (for example, prohibition of shift-up), due to that the change in driving force during turning can be suppressed, thus a certain good turn feeling can be obtained. Also in such case, according to the invention, any steering wheel angle sensor, yaw rate sensor or lateral acceleration sensor is not necessary, so that an inexpensive vehicle control device can be obtained.

Furthermore, although in this embodiment, a steering shaft torque is operated based on the Expression 1 and it is to be a turn intention indicator, a motor current can be approximately operated from a steering torque and a vehicle speed. On the contrary, since, as described above, a motor current is determined from a steering torque and a vehicle speed, the steering torque can be approximately operated from a motor current and a vehicle speed. As a result, it is preferable that the turn intention detector is inputted with a steering torque and a vehicle speed to operate a steering shaft torque and lets it a turn intention indicator. Alternatively, it is preferable that the turn intention detector is inputted with a motor current and a vehicle speed to operate the steering shaft torque and lets it a turn intention indicator.

Further, although in this embodiment, a steering shaft torque is operated based on the Expression 1 and it is to be a turn intention indicator, a steering shaft torque is not necessarily used as the steering intention indicator, but the turn intention of a driver can be detected at least based on information regarding a steering force of steering (a steering torque or a steering assist torque), which also serves as the turn intention indicator. In addition, information regarding a steering force of steering is not necessarily obtained from an electric power steering device. Alternatively, also by using a torque sensor or a force sensor that is mounted in a steering mechanism, as compared with the conventional steering wheel angle or yaw rate sensor, lateral acceleration sensor or the like, a turn intention can be detected early, thus enabling a vehicle control without any uncomfortable feeling.

Furthermore, although in this embodiment, a continuously variable transmission is employed and a target gear ratio is operated based on the Expression 2 to make a shift-down, it is preferable that a stepped transmission is employed and that, in the same manner as in the conventional device, a shift-down is performed by the method of correcting the value of a gear change map.

Further, although in this embodiment, a gear ratio of a transmission is controlled, in the same manner as in several general continuously variable transmissions, the present invention is also applicable without problem to a transmission in which the gear ratio is not directly controlled and the engine speed on the input side of the transmission is controlled (actually the gear ratio is changed).

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicle control device comprising:
   turn intention detecting means for detecting a turn intention of a driver at least based on information regarding a steering force of a steering; and
   gear ratio control means for controlling a gear ratio of an automatic transmission,
   wherein said gear ratio control means controls the gear ratio based on an output from said turn intention detecting means.

2. The vehicle control device according to claim 1, wherein said gear ratio control means makes the gear ratio larger, in the case that the turn intention to be detected by said turn intention detecting means is large, as compared with the case that the turn intention is small.

3. The vehicle control device according to claim 1, wherein said gear ratio control means limits a change of the gear ratio to a predetermined range, in the case that the turn intention to be detected by said turn intention detecting means is larger than a predetermined value.

4. The vehicle control device according to claim 1, wherein said turn intention detecting means at least includes steering torque detecting means for detecting a steering torque of the driver and motor current detecting means for detecting the motor current of an electric motor acting to assist the steering force of the driver, and detects the turn intention at least based on an output from said steering torque detecting means and an output from said motor current detecting means.

5. The vehicle control device according to claim 1, wherein said turn intention detecting means at least includes steering torque detecting means for detecting a steering torque of the driver and vehicle speed detecting means for detecting a velocity of a vehicle or a wheel speed, and detects the turn intention at least based on an output from said steering torque detecting means and an output from said vehicle speed detecting means.

6. The vehicle control device according to claim 1, wherein said turn intention detecting means at least includes motor current detecting means for detecting a motor current of an electric motor acting to assist a steering force of a driver and vehicle speed detecting means for detecting a velocity of a vehicle or a wheel speed, and detects the turn intention at least based on an output from said motor current detecting means and an output from said vehicle speed detecting means.

7. The vehicle control device according to claim 1, wherein the automatic transmission is a stepped transmission.

8. The vehicle control device according to claim 1, wherein the automatic transmission is a continuously variable transmission.

9. The vehicle control device according to claim 1, wherein the gear ratio control means determines a target base gear ratio based on an accelerator pedal depression amount or a vehicle speed.

10. The vehicle control device according to claim 9, wherein the wherein the gear ratio control means outputs a target gear ratio which is based on the determined target base gear ratio and the turn intention signal output from said turn intention detecting means.

11. The vehicle control device according to claim 1, wherein the turn intention detection means outputs a turn intention signal corresponding to a steering torque signal based on a steering torque input by the driver and a motor current signal based on a motor current supplied to a steering assist motor.

* * * * *